J. D. WELLIVER.
AUTOMOBILE CRANKER.
APPLICATION FILED JUNE 19, 1915.
1,168,134.
Patented Jan. 11, 1916.
2 SHEETS—SHEET 2.
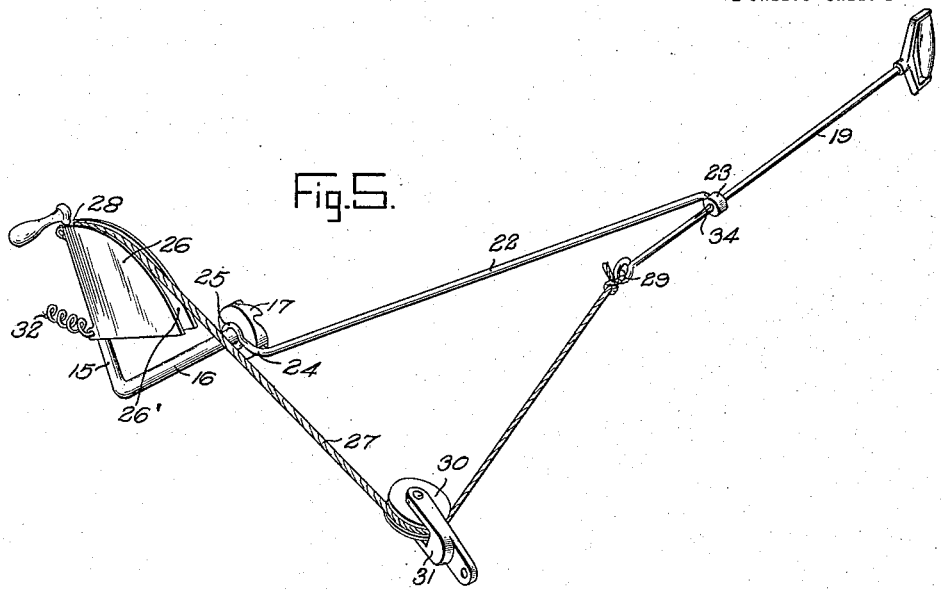
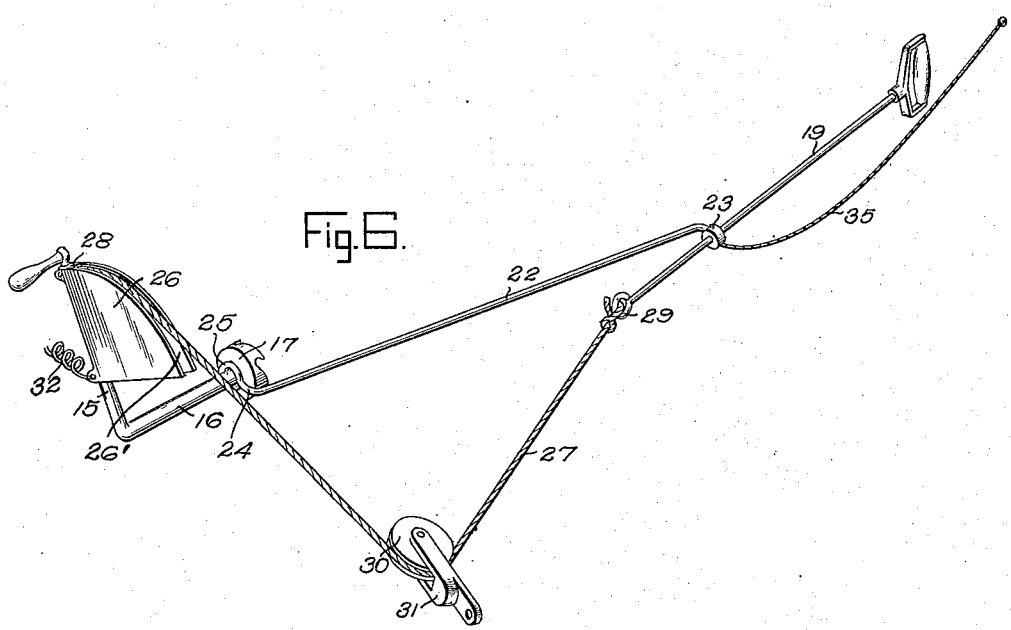
WITNESSES
INVENTOR
J.D. Welliver
BY
ATTORNEYS

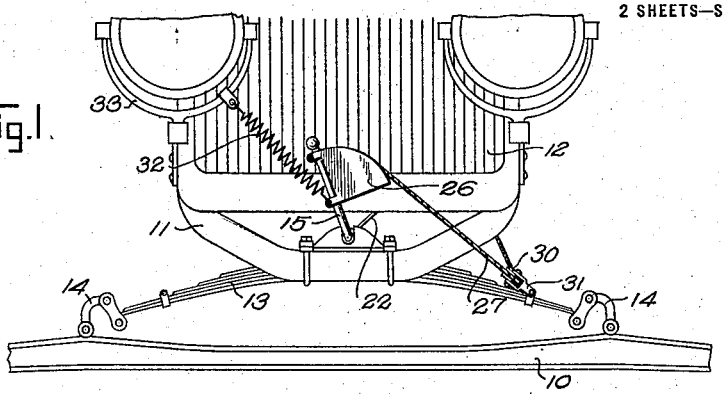
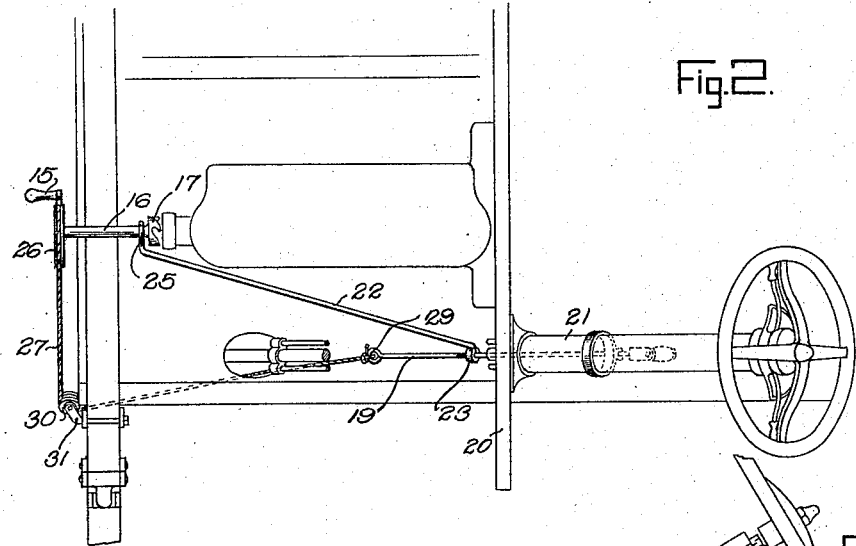
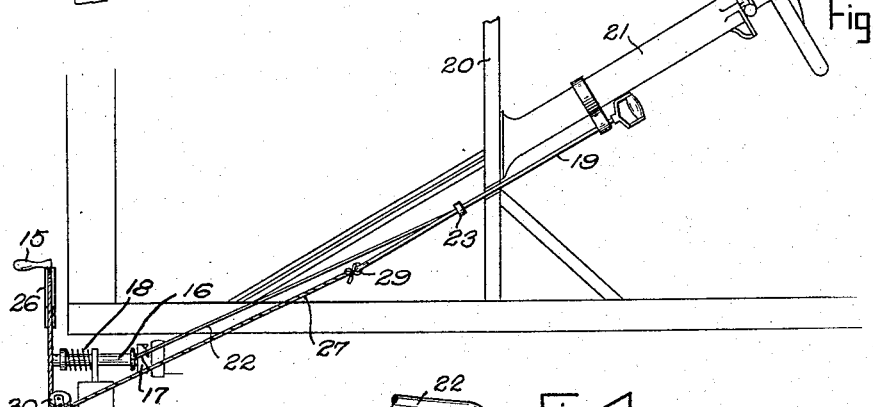
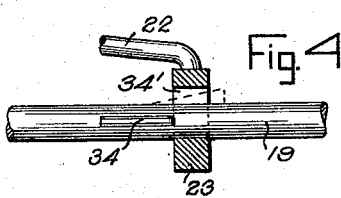

UNITED STATES PATENT OFFICE.

JACOB D. WELLIVER, OF MILFORD, PENNSYLVANIA, ASSIGNOR OF ONE-FOURTH TO WILLIAM B. KENWORTHY AND ONE-FOURTH TO GEORGE R. BULL, BOTH OF MILFORD, PENNSYLVANIA.

AUTOMOBILE-CRANKER.

1,168,134. Specification of Letters Patent. Patented Jan. 11, 1916.

Application filed June 19, 1915. Serial No. 35,060.

*To all whom it may concern:*

Be it known that I, JACOB D. WELLIVER, a citizen of the United States, and a resident of Milford, in the county of Pike and State of Pennsylvania, have invented a new and Improved Automobile-Cranker, of which the following is a full, clear, and exact description.

This invention relates to carriages and wagons and has particular reference to starting devices for the motors of automobiles.

Among the objects of the invention is to provide a mechanical cranking device adapted to be easily, quickly and reliably attached to the ordinary cranking mechanism of an automobile motor and which may be operated by the driver of a car while seated in his place.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings in which like reference characters designate the same parts in the several views, and in which—

Figure 1 is a front elevation of that portion of a well known type of automobile adjacent the cranking devices; Fig. 2 is a plan view of the same; Fig. 3 is an elevation of the left side thereof; Fig. 4 is a detail of a portion of the draft devices described more fully below; Fig. 5 is a perspective view or diagram indicating the relation of the draft devices to the crank; and Fig. 6 is a view similar to Fig. 5 but showing a slight modification.

Referring more particularly to the drawings, I show at 10 a front axle and at 11 a portion of the frame supporting the body 12 of a machine through a spring 13 and hangers 14. These parts are conventional and may relate to any style or type of automobile.

At 15 I indicate a hand crank arranged ordinarily at the front end of the machine and having its shaft 16 extending rearwardly and carrying a clutch head 17. In the usual operation of the crank by hand, while the operator stands in front of it, he grasps the handle and forces the shaft 16 and clutch 17 rearwardly against the force of the spring 18 to bring the clutch into engagement with the motor. The rearward thrust, therefore, is made ordinarily preliminary to the rotation of the shaft through the crank 15, but when the motor speeds up under its own force, the crank is restored to its normal position out of contact with the motor by virtue of the spring 18.

At 19 I provide a pull rod extending through or along the dashboard 20 substantially parallel to the steering post 21.

At 22 I provide a clutch rod having a head 23 slidable on the rod 19, the axis of the head being arranged approximately parallel to the axis of the main portion of the rod 22, and at the front end the rod is provided with an angular extension 24 having a loop 25 surrounding the shaft 16 just against the front face of the clutch head 17.

At 26 I show a quadrant secured rigidly to the crank 15 and having a groove 26' in its periphery in which is located a flexible connection 27, the point of connection being at the farther end of the groove or adjacent the end of the crank at the points 28. The other end of the connection 27 is secured in an eye 29 at the front end of the pull rod 19. The intermediate portion of the cord or connection 27 operates over a direction pulley 30 having a bracket 31 adapted to be secured in any substantially fixed position as upon the spring 13.

Any suitable means may be provided to pull rearwardly upon the auxiliary rod 22 preliminary to the exertion of the cranking action through the connection 27. It will be understood that the rods 19 and 22 are adapted for a certain amount of independent movement while they are both adapted to be drawn rearwardly in the same general direction and simultaneously during a portion of the operation. The crank and quadrant carried thereby are adapted to be carried in a normal position such that when a draft is applied thereto tending to rotate the same for starting the motor, such action will take place promptly. The normal position of the crank is indicated in Fig. 1, it being so held by a spring 32 connected at one end to any suitable portion of the crank and at its other end to a fixed point as upon a lamp bracket 33. As shown in Figs. 4 and 5, the pull rod 19 is provided with a spring catch 34 adapted to engage the head 23 of the auxiliary rod 22. The catch is adapted to engage against the front face of the head 23 when the draft rod 19 is drawn rearwardly and will, therefore, cause the auxiliary pull rod 22 to be drawn to set the clutch. The connection 27 may be slightly slack to allow this initial backward draft upon the clutch before starting the rotation of the crank and its shaft 16. After this initial pull, however, upon the rod 22, a slight rotation of the rod 19 will cause the catch 34 to register with and pass through a notch 34' formed longitudinally through the head 23 allowing the rod 19 to be drawn rearwardly to the extent required to rotate the crank through the connection 27. When the operator releases the rod 19 after the engine is started, or if a subsequent impulse is required to start the motor, the catch 34 will snap through the head 23 so as to reëngage as above described. When the motor speeds up, its tendency to race ahead of the crank shaft 16 will cause the other member of the clutch to throw the clutch head 17 forwardly out of engagement as usual. As shown in Fig. 6, the head 23 may have free slidable movement along the rod 19 without respect to the spring catch 34, and I provide a cord or other suitable connection 35 with the head 23 whereby the operator may control the clutch mechanism by one hand independently of the cranking draft connections with the other hand.

I claim:—

1. In a mechanical cranking device for automobiles, the combination with a crank and clutch head carried thereby, of means normally holding the crank in elevated position suitable for cranking, a draft member within reach of the driver adjacent the steering post and movable rearwardly substantially parallel thereto, a flexible connection leading from the draft member to the crank, a direction pulley over which the intermediate portion of the flexible connection operates, an auxiliary draft member movable adjacent the first mentioned draft member at one end and having the other end coöperating with the clutch head, and means to cause a rearward effective draft upon the auxiliary draft member to set the clutch preliminary to the rotation of the crank through said flexible connection.

2. In a device of the character set forth, the combination with an automobile crank shaft having a clutch head at its rear end and a crank at its front end, of a quadrant member secured to the crank and having a grooved periphery, a flexible connection secured in the groove of said quadrant member and extending laterally of the machine therefrom, means to guide the other end of the flexible connection rearwardly, a draft member connected to the rear end of the flexible connection within reach of the operator adjacent the steering post, and an auxiliary draft member comprising a rod having ends arranged at angles to the main portion thereof, one end of the rod constituting a head slidable upon the first mentioned draft member and the other end having a loop embracing the crank shaft adjacent the front face of the clutch head, substantially as set forth.

JACOB D. WELLIVER.

Witnesses:
 MARION B. POILLON,
 GEO. R. BULL.

Copies of this patent may be obtained for five cents each, by addressing the "Commissioner of Patents, Washington, D. C."